United States Patent [19]

Simmons et al.

[11] 4,053,241
[45] Oct. 11, 1977

[54] CHAMBERED MIRROR CONSTRUCTION FOR LASERS

[75] Inventors: Gerald P. Simmons, Washington; Hiram A. Brubaker, Peoria; William E. Streight, East Peoria, all of Ill.

[73] Assignee: Caterpillar Tractor Co., Peoria, Ill.

[21] Appl. No.: 689,691

[22] Filed: May 24, 1976

[51] Int. Cl.² ............................................. G02B 5/08
[52] U.S. Cl. .................................... 350/310; 350/288
[58] Field of Search ...................... 350/288, 293, 310; 331/94.5 D

[56] References Cited

U.S. PATENT DOCUMENTS

| 3,488,110 | 1/1970 | Envoy | 350/310 X |
|---|---|---|---|
| 3,637,296 | 1/1972 | McLafferty et al. | 350/310 |
| 3,731,992 | 5/1973 | Mansell | 350/310 |
| 3,781,094 | 12/1973 | Griest | 350/310 |
| 3,817,606 | 6/1974 | Locke et al. | 350/310 |
| 3,836,236 | 9/1974 | Kirk et al. | 350/310 |
| 3,861,787 | 1/1975 | Locke et al. | 350/310 X |
| 3,909,118 | 9/1975 | Schmidt | 350/310 |
| 3,986,768 | 10/1976 | Peters et al. | 350/310 |

*Primary Examiner*—F. L. Evans
*Attorney, Agent, or Firm*—Phillips, Moore, Weissenberger, Lempio & Majestic

[57] ABSTRACT

A system for cooling a mirror such as a laser mirror is provided. The system includes a mirror having a reflective surface and a plurality of coolant chamber cavities arranged in serial order from an inlet to an outlet. Restrictive flow passages formed within walls between the cavities control coolant flow and produce desired turbulence within the cavities for enhanced heat transfer from the mirror to the coolant.

8 Claims, 4 Drawing Figures

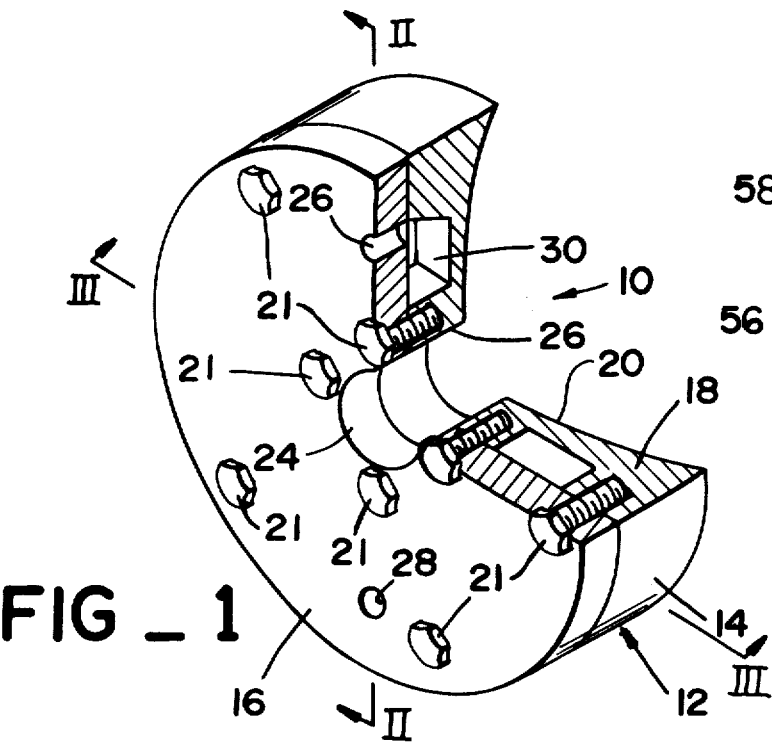
FIG_1
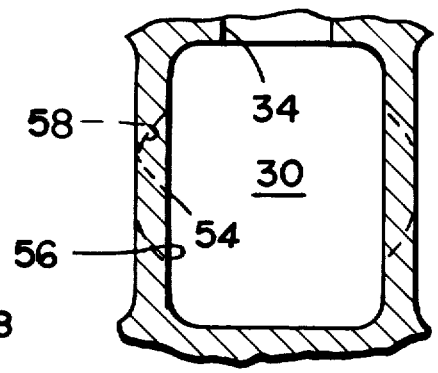
FIG_4
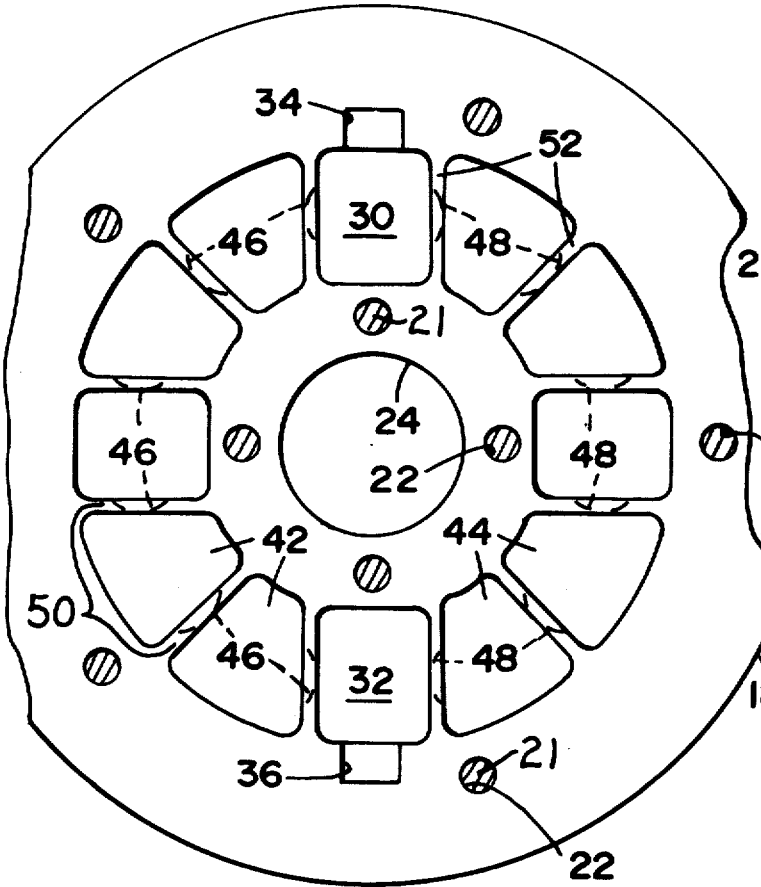
FIG_3
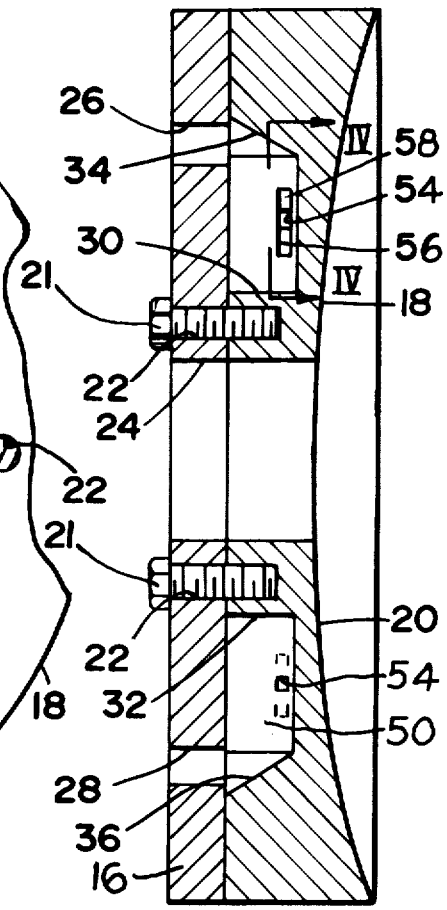
FIG_2

CHAMBERED MIRROR CONSTRUCTION FOR LASERS

BACKGROUND OF THE INVENTION

This invention relates to fluid cooling systems for mirrors, and in particular those suitable for laser mirrors.

Fluid cooling of laser mirrors has been made necessary as higher powered laser systems have been encountered. Recent advances in the laser art have provided lasers suitable for heavy industrial applications, such as shown in U.S. Pat. No. 3,907,408 to Engel, assigned to the assignee hereof.

With this and other high powered lasers, some having mirrors with a centrally disposed bore for passage of the laser beam, more effective fluid cooling systems are required.

High powered lasers have mirrors that are various shapes including flat, convex and concave. These shapes must be held for the proper functioning of the laser with which they are used. Therefore, the heat distortion can and must be kept to a minimum in properly designed mirror coolant systems.

SUMMARY AND OBJECTS OF THE INVENTION

This invention relates to a mirror system having a series of coolant cavities behind the reflective surface of the mirror body. These coolant cavities include an inlet for admitting cool coolant fluid to a first one of the cavities and a coolant outlet for expelling heated coolant fluid. Walls intermediate the coolant cavities contain restrictive flow passages which serve to control the flow of fluid from the inlet to the outlet and also produce a desirable turbulence within the coolant chambers. The turbulence engendered in the coolant fluid enhances the heat transfer between the back side of the mirror reflective surface and the coolant fluid. In this manner, lasers having greater power and consequently greater heat energy and generation within the mirror may be successfully accommodated.

The coolant chambers and passages also achieve the enhanced heat transfer capability aforementioned without a corollary occurence of a high pressure drop. This high pressure drop is encountered with other systems that use many small passages as coolant fluid transfer passages.

The passages of the instant invention serially connect a plurality of coolant chambers arranged in a circular configuration about a centrally disposed bore in a mirror. The passages are desirably of square and trapezoidal cross section but may also be of other configurations, such as rectangular, triangular, etc. The relatively thin walls between the serially arranged coolant chambers act as thin fins to assist in drawing heat away from the mirror reflective surface and into the path of flow of the fluid coolant. Any suitable fluid coolant may be used including, for example, water. In use, it sometimes is desirable to preheat the mirror to reduce thermal shock by flowing hot water therethrough prior to introduction of the beam onto the mirror surface. After the beam has been applied to the surface, cool water or various other coolant fluids can then be used to maintain a desired equilibrium temperature in the mirror itself.

The mirror design of this invention also results in improved strength of the mirror itself, since the walls between the coolant chamber serve to strengthen the mirror and help it resist thermal distortion. This additional strength is not found with mirror systems such as shown in aforementioned U.S. Patent No. 3,907,408.

It is therefore the primary object of this invention to provide an improved fluid cooled mirror assembly having a plurality of fluid coolant chambers for effective removal of heat.

It is further object of this invention to provide such a mirror assembly having restrictive flow passages between coolant chambers of a mirror, such as for example a laser mirror, which create turbulence and enhance heat transfer between the mirror and the fluid.

It is a still further object of this invention to provide a fluid cooled mirror having fluid coolant chambers therein separated by thin walls which assist the heat transfer as well as strengthen the mirror so as to avoid thermal distortion.

It is a further object of this invention to provide such a mirror system which is simple to construct and provides enhanced heat transfer capability over currently available systems.

Further and other objects of this invention will become more readily apparent from a review of the following description and accompanying drawings.

BRIEF DESCRIPTION OF THE DRAWINGS

FIG. 1 is a top-quarter isometric view partially cut away of the fluid cooled mirror assembly of the instant invention illustrating the internal coolant chambers;

FIG. 2 is a side elevation cross-sectional view of the same, taken along lines II—II in FIG. 1;

FIG. 3 is a front elevational view of the same taken along lines III—III in FIG. 1, and, FIG. 4 is an enlarged partial sectional view of the outlet coolant chamber taken along lines IV—IV in FIG. 2.

DETAILED DESCRIPTION

As shown in FIG. 1, the mirror systems of the present invention comprises a mirror assembly shown generally at 10. The assembly comprises a generally circular mirror body 12 having cylindrical side walls 14, a generally circular back plate 16, and a concave mirror 18 having a reflective surface 20. The mirror body may be made of any suitable mateial wherein the surface may be polished to a high degree of reflectivity, such as copper.

The mirror 12 and back plate are conveniently held together by means of a plurality of bolts 21 passing through a plurality of threaded, receiving bolt holes 22 peripherally arranged around the mirror in equally spaced relation, as seen in FIG. 2. A centrally disposed aperture 24 through the back plate and mirror allows the free passage of a centrally focused laser beam (not shown). An inlet bore 28 in mirror 12 intercommunicates the exterior of back plate 16 with a first coolant chamber 32. Similarly, an outlet bore 26 communicates a last coolant chamber 30 with the exterior of the back plate 16 as best seen in FIG. 2. The back plate may be sealed with respect to the mirror body by any convenient means such as epoxy cement or "O" ring seals (not shown).

As also seen in FIG. 2, a ramp-shaped entry passage 36 assists in the flow of coolant fluid from inlet passage 28 to the coolant chamber 32. Similarly, an exit passage 34 having a ramp shape assists in exit of coolant from chamber 30 through outlet 26.

Turning to FIG. 3, it may be seen that a number of coolant chambers 42, 44 are serially formed in a generally circular shape from the first or inlet chamber 32 to last or outlet chamber 30. The chambers may conveniently be of generally trapezoidal or rectangular shape as shown. They are conveniently formed by machining with a circular milling cutter in the mirror 12. A different cutter may also be used to form a plurality of restrictive flow passages 46, 48 in the thin walls 50, 52, respectively, formed between the chambers. In this manner, coolant fluid is restricted in passage from chamber to chamber which causes turbulence, thereby enhancing transfer of heat from the mirror to the fluid. Also, the thin walls serve as thin fin heat transfer conduits for conducting heat away from the mirror surface to the region of the coolant chamber where it is transferred to the fluid therein. At the same time, the walls provide strength to the mirror, thereby resisting thermal distortion.

As seen in FIG. 4, the restrictive passages formed by the circular milling cutter include a generally rectangularly shaped inlet opening 54, a similarly shaped outlet opening 56, and a curved wall transition portion 58 therebetween which facilitates the passage of coolant fluid.

It is to be understood that the foregoing description is merely illustrative of the preferred embodiment of the invention and that the scope of the invention is not to be limited thereto, but is to be determined by the scope of the appended claims.

What is claimed is:

1. In a fluid cooled mirror assembly,
   a generally circular mirror having a reflective surface and a centrally disposed opening therethrough,
   a plurality of coolant chambers beneath said reflective surface of said mirror, said coolant chambers being serially arranged in two generally semicircular arcs from a first one to a last one of said plurality of coolant chambers,
   an inlet in said mirror for admitting coolant fluid to said first one of said plurality of coolant chambers,
   an outlet in said mirror for allowing removal of coolant fluid from said last one of said plurality of coolant chambers, walls formed in said mirror intermediate adjacent ones of said plurality of coolant chambers, and
   coolant passages in said walls interconnecting adjacent ones of said plurality of coolant chambers for flow of coolant fluid from said inlet to said outlet.

2. The invention of claim 1 wherein said coolant passages include an inlet opening and an outlet opening, said inlet opening being communicated with said outlet opening by means of a transition portion.

3. The invention of claim 2 wherein said inlet opening and said outlet opening are generally rectangular in shape.

4. The invention of claim 3 wherein said transition portion includes curved walls extending from said inlet opening to said outlet opening.

5. The invention of claim 1 wherein said walls are directed generally perpendicular to said mirror surface whereby heat may be conducted therefrom and to coolant fluid in said chambers.

6. The invention of claim 1 wherein said mirror comprises a generally circular body and a generally circular back plate, said circular back plate having a centrally disposed bore therein in concentric alignment with said centrally disposed opening in said mirror.

7. The invention of claim 1 wherein said mirror is of metal material.

8. The invention of claim 1 further including a ramp-shaped entry passage in said mirror leading from said inlet to said first coolant chamber, and a ramp-shaped entry passage in said mirror leading from said last coolant chamber to said outlet for facilitating flow of coolant fluid.

* * * * *